United States Patent [19]

Burst et al.

[11] Patent Number: 4,962,883
[45] Date of Patent: Oct. 16, 1990

[54] AIR CONDITIONING SYSTEM FOR A MOTOR VEHICLE

[75] Inventors: Hermann Burst, Rutesheim; Walter Pross, Sindelfingen, both of Fed. Rep. of Germany

[73] Assignee: Dr. Ing. h.c.F. Porsche AG, Fed. Rep. of Germany

[21] Appl. No.: 421,359

[22] Filed: Oct. 13, 1989

[30] Foreign Application Priority Data

Oct. 31, 1988 [DE] Fed. Rep. of Germany ....... 3836992

[51] Int. Cl.⁵ ............................................ G05D 23/00
[52] U.S. Cl. .................................................. 237/2 A
[58] Field of Search ................... 237/2 A, 81, 12.3 A, 237/12.3 B, 12.3 R

[56] References Cited

FOREIGN PATENT DOCUMENTS 3048626 7/1982 Fed. Rep. of Germany .
61-178213 8/1986 Japan .

*Primary Examiner*—Henry A. Bennet
*Attorney, Agent, or Firm*—Evenson, Wands, Edwards, Lenahan & McKeown

[57] ABSTRACT

An air conditioning arrangement for a motor vehicle with an internal combustion engine whose fuel air mixture supply system is equipped with a fuel cut off in the coasting operation, utilizes a switching device which, in the case of a high heat requirement, at least temporarily stops the fuel cut off in the coasting operation.

12 Claims, 2 Drawing Sheets

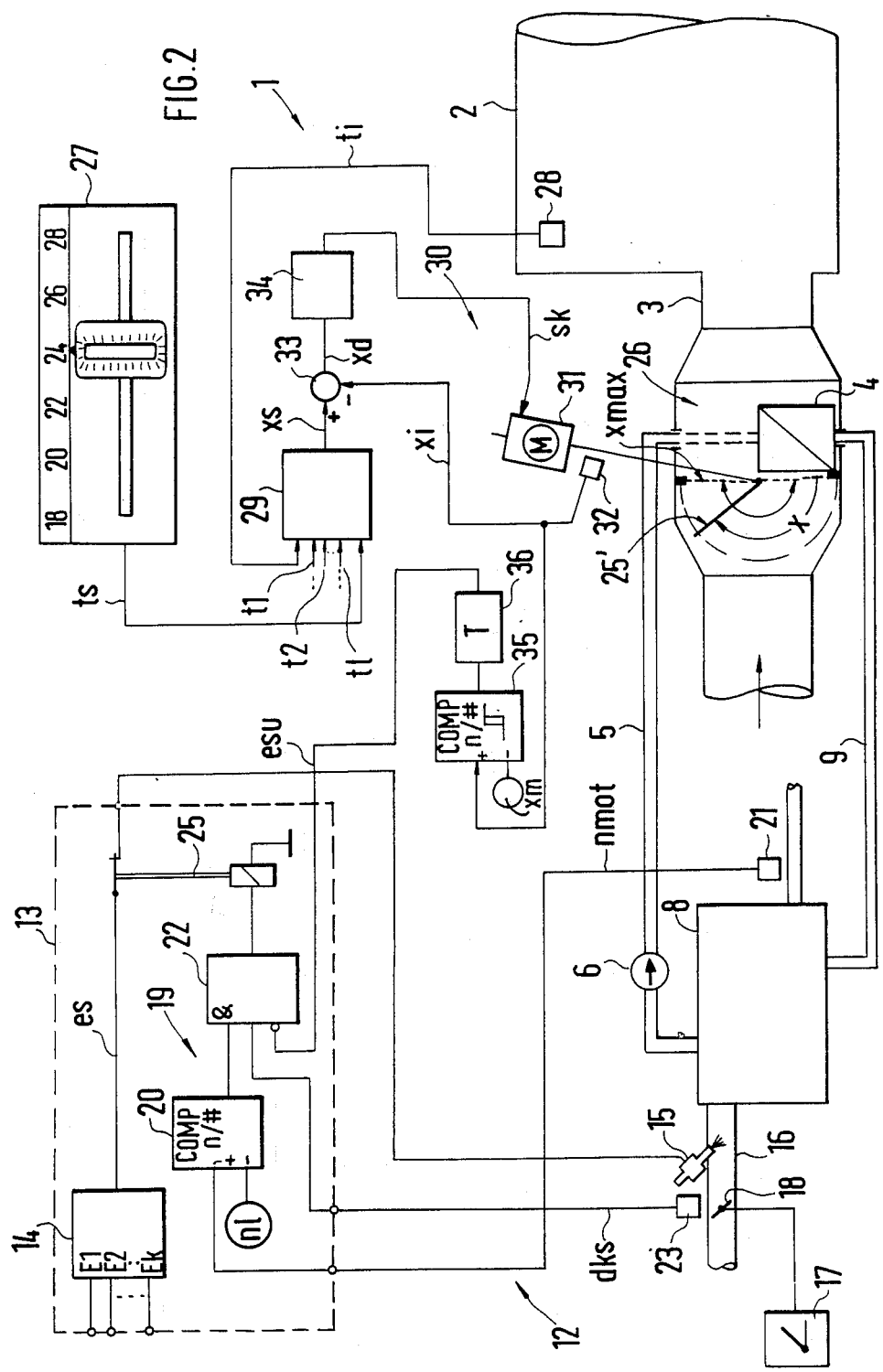

AIR CONDITIONING SYSTEM FOR A MOTOR VEHICLE

BACKGROUND AND SUMMARY OF THE INVENTION

The present invention generally relates to an air conditioning system for a motor vehicle; and more particularly to an air conditioning system which ensures the comfort of the passenger compartment without any significant load dependent temperature fluctuations.

In motor vehicles which are equipped with internal combustion engines, the waste heat (lost heat) generated by the internal combustion engine is frequently used for heating the passenger compartment. In an air conditioning system, the waste heat taken from the cooling circuit or the exhaust gas of the internal combustion engine, in an air conditioning system, by at least one heat exchanger, is used for heating an air current which is guided to the passenger compartment.

For some time, however, motor vehicles have increasingly been equipped with fuel consumption optimized driving system concepts. These comprise, for example, a fuel/air mixture supply system with a fuel cut-off during coasting Since, in the case of motor vehicles in coasting phases, no fuel is converted into energy in the internal combustion engine, only frictional heat and stored heat can be used for heating purposes. If the heat for heating purposes is taken from the exhaust gas, the utilization of stored heat is practically completely non-existent.

Thus, it is an object of the present invention to provide an air conditioning arrangement for motor vehicles which ensures the comfort of the passenger compartment without any significant load dependent temperature fluctuations.

Principal advantages of preferred embodiments of the invention are that an air conditioning arrangement for motor vehicles is provided which, for achieving a comfortable temperature, rapidly heats a passenger department to a desired temperature level and maintains this temperature level without any significant load dependent temperature fluctuations.

This is mainly achieved in that, when the heat requirement is increased, a fuel cut-off during a coasting operation of the internal combustion engine is at least temporarily interrupted. In this case, the increased heat requirement may be characterized by a position of a control element affecting the heating of the passenger compartment, particularly by a position in the range of a maximum value (maximal heating).

Other objects, advantages and novel features of the present invention will become apparent from the following detailed description of the invention when considered in conjunction with the accompanying drawings.

BRIEF DESCRIPTION OF THE DRAWINGS

FIG. 2 is an air conditioning arrangement according to a different embodiment of the invention.

DETAILED DESCRIPTION OF THE DRAWINGS

Figure 1:
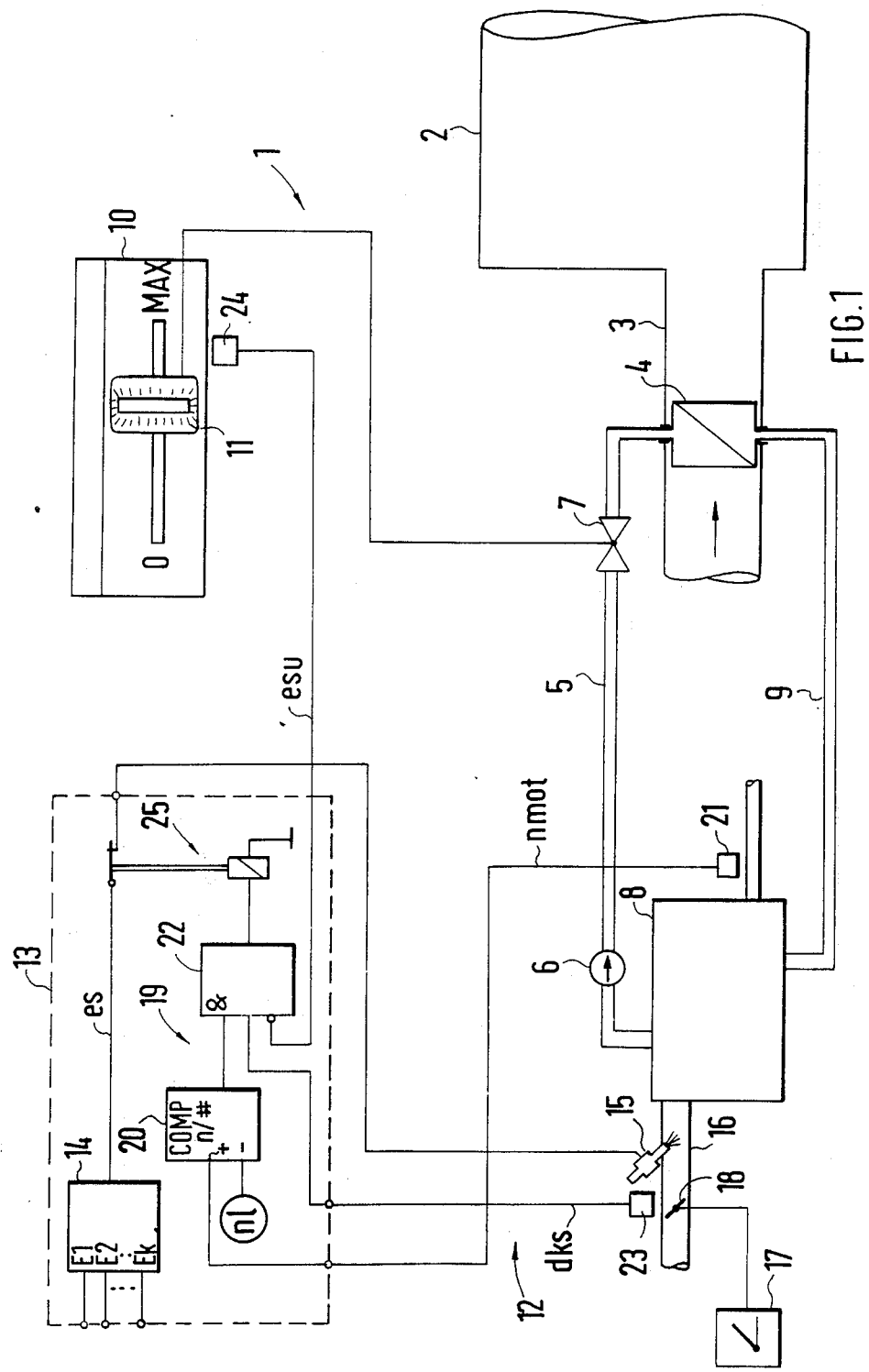
FIG. 1 is an air conditioning arrangement according to one embodiment of the invention.

The invention is explained in detail in the following by means of embodiments shown in the drawings.

FIG. 1 shows a controllable air conditioning arrangement for a passenger compartment 2 of a motor vehicle which is not shown (without limiting the generality of known air conditioning arrangements, a heating system is shown which is controlled on the water side, however, this embodiment is equally applicable to arrangements wherein the control is on the air side).

A heat exchanger 4 is arranged in an air duct 3 leading to the passenger compartment 2. A coolant, which is heated by the waste heat of the internal combustion engine 8, is guided to the heat exchanger 4 by a forward flow pipe 5 having a pump 6 and a heating valve 7. After passing through the heat exchanger 4, this coolant, in a cooled condition, is returned to the internal combustion engine 8 through a return flow pipe 9. The degree of opening of the heating valve 7 can be controlled by a control element 10 (operating lever 11).

A fuel/air mixture supply system 12 comprises a known control apparatus 13 having a control unit 14 which generates a fuel injection signal es as a result of several input signals E1, E2, ..., Ek (such as engine load, engine speed nmot, throttle valve position dks, engine temperature etc.). The fuel injection signal es controls an injection valve 15 which, according to a signal es, injects fuel into an intake pipe 16 of the internal combustion engine by means of a throttle valve 18 controlled by an accelerator pedal 17.

The control apparatus 13 comprises a symbolically shown fuel cut-off circuit 19 which normally is already integrated into the control unit 17. The representation contains a first comparator 20 which compares the engine speed nmot sensed by a speed sensor 21 with a threshold value n1, and when the threshold value n1, which is decisive for the fuel cut off is exceeded, emits a signal to an AND element 22, which is connected to an output of the comparator 20.

In addition, the AND element 22, via an input with a throttle valve switch 23 which, when the throttle valve 18 is shut, emits a signal and via a negating input, is connected with a position detector 24 which scans a position of a control element 10 (operating lever 11) in the range of the maximum value MAX (maximal heating) and, if necessary, emits a stop signal esu. The position detector 24 preferably has a switching hysteresis so that it is switched on, for example, at about 90% of the maximum value MAX, but does not switch off again before about 80% of MAX is reached.

In the absence of the stop signal esu, a relay 25 controlled by the AND element 22 interrupts the fuel injection signal es, if the signal of the comparator 20 as well as the signal dks of the throttle valve switch 23, in the absence of the stop signal esu, are simultaneously present at the inputs of the AND element 22. In this case, the AND element 22, together with the position detector 24, forms a switching device for stopping the fuel cut-off during the coasting operation of the internal combustion engine 8, if the position of the control element 10 is in the range of the maximum value MAX.

Naturally, the fuel cut-off may also depend on other operating conditions of the internal combustion engine 8 or of the vehicle, and the fuel/air mixture supply system may also be a carburetor. The injection valve 15 will then be replaced by a fuel cut off valve which, instead of being fed by the control unit 14, is fed directly with operating current (from the ignition circuit) (not shown).

An air conditioning arrangement with an automatic temperature control is shown in FIG. 2, again without limiting the generality, by means of the example of a heating system controlled on the air side, control on the water side also being envisioned by this embodiment. The heating of the interior, in this case, is influenced by a temperature mixing flap 25' as the control element which guides the air current supplied to the passenger compartment 2, in a temperature mixing chamber 26, either completely or partially through the heat exchanger 4 or guides it partially or completely past it.

A desired temperature ts may be indicated by a desired value indicating unit 27. From this desired temperature ts and a passenger compartment temperature ti, which is sensed in the passenger compartment 2 by a temperature sensor 28 and possibly from other input signals t1, t2, . . . , tl (outside temperature, etc.), a desired value computer 29 (for example, from the temperature difference (ts−ti)) determines a desired position xs of the temperature mixing flap 25'.

A position control circuit 30 with a motor operator 31 adjusts position x of the temperature mixing flap 25' corresponding to the desired position xs. For this purpose, the actual position xi of the temperature mixing flap 25' is detected by a position detector 32. A comparator 33 compares the desired position xs and the actual position xi (control difference xd=xs−xi). Finally a control signal sk for the motor operator 31 is made available from the control difference xd by the regulator with the electronic control system 34.

The actual position xi (or, as an alternative, the desired position xs), in the second comparator 35, is compared with a threshold value xm (which may, for example, be at about 90% of the maximum value xmax of position x). The comparator 35 may also have a switching hysteresis such that the stop signal esu will always be emitted when a first higher threshold value xmo (about 90% max) is already exceeded, but there is not yet any lowering of this threshold to a second lower threshold value xmu (about 80% of max). The AND element 22 is then acted upon either directly or by way of a delay circuit 36 by the output signal esu of the second comparator 35. The delay circuit 36 will, in this case, not pass on a signal of the second comparator 35 to the AND element 22 before it has been present at least for a characteristic time period T. This is used particularly for settling the switching.

Naturally, the air conditioning arrangement shown in FIG. 2 may also be used in heating systems controlled on the waster side. However, a preferred application is the use in heating systems which are controlled on the air side, in which the energy required for the heating is taken from the exhaust gas of a particularly air cooled, internal combustion engine 8. The forward flow pipe 5 will then correspond to an exhaust pipe of the internal combustion engine 8; the pump 6 and the return flow pipe 9 are absent; and the outlet of the heat transfer medium, i.e. exhaust gas, from the heat exchanger 4 ends in the exhaust system or in the open air.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. An air conditioning arrangement for a motor vehicle with an internal combustion engine whose fuel/air mixture supply system is equipped with a fuel cut-off in a coasting operation, the air conditioning arrangement being controllable and converting waste heat generated by the internal combustion engine for heating at least one passenger compartment of the motor vehicle and having a control element which indirectly or directly influences heating of the passenger compartment of the motor vehicle, a position of the control element, corresponding to a heat requirement, being controllable arbitrarily between a minimum value and a maximum value, wherein fuel cut-off control is provided for at least temporarily stopping the fuel cut-off in the coasting operation when the control element is in a position in a range of a maximum value.

2. An air conditioning arrangement according to claim 1, wherein the control element is an operating lever for the adjustment of one of a position of a temperature mixing flap and a degree of opening of a heating valve.

3. An air conditioning arrangement according to claim 1, wherein the control element is one of a temperature mixing flap and a heating valve.

4. An air conditioning arrangement according to claim 1, wherein the fuel cut-off control, when the control element is in a position situated in the range of the maximum value, controls a stopping of the fuel cut-off in the coasting operation only after the expiration of a certain time period.

5. An air conditioning arrangement according to claim 1, wherein the air conditioning arrangement further comprises a first desired value computer which controls a desired value for the control element and which, in the case of a certain desired value xs in the range of the maximum value for the position of the control element, emits a signal to a control apparatus for the control of the fuel supply to the internal combustion engine, on the basis of which the control apparatus stops the fuel cut-off in the coasting operation.

6. An air conditioning arrangement according to claim 1, wherein the fuel cut-off control has a switching hysteresis.

7. An air conditioning arrangement for a motor vehicle with an internal combustion engine whose fuel/air mixture supply system is equipped with a fuel cut-off in a coasting operation, the air conditioning arrangement being controllable and converting waste heat generated by the internal combustion engine for heating at least one passenger compartment of the motor vehicle and having a control element which indirectly or directly influences the heating of the passenger compartment of the motor vehicle, a position of the control element, corresponding to a heat requirement, being controllable arbitrarily between a minimum value and a maximum value, wherein the air conditioning arrangement includes a switching device which, when the control element is in a position situated in the range of the maximum value, at least temporarily controls a stopping of the fuel cut-off in the coasting operation.

8. An air conditioning arrangement according to claim 7, wherein the control element is an operating lever for the adjustment of one of a position of a temperature mixing flap and a degree of opening of a heating valve.

9. An air conditioning arrangement according to claim 7, wherein the control element is one of a temperature mixing flap and a heating valve.

10. An air conditioning arrangement according to claim 7, wherein the switching device, when the control element is in a position situated in the range of the maximum value, controls a stopping of the fuel cut-off in the coasting operation only after the expiration of a certain time period.

11. An air conditioning arrangement according to claim 7, wherein the air conditioning arrangement further comprises a first desired value computer which controls a desired value for the control element and which, in the case of a certain desired value xs in the range of the maximum value for the position of the control element, emits a signal to a control apparatus for the control of the fuel supply to the internal combustion engine, on the basis of which the control apparatus stops the fuel cut-off in the coasting operation.

12. An air conditioning arrangement according to claim 7, wherein the switching device has a switching hysteresis.

* * * * *